Figure 1:
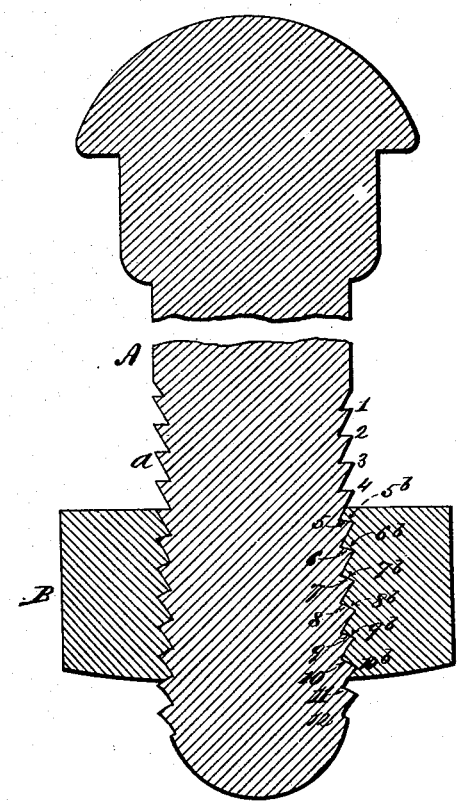

(No Model.)  F. H. HOWES.  2 Sheets—Sheet 1.
LOCK NUT.

No. 361,289.  Patented Apr. 19, 1887.

Witnesses:
R. C. Howes.
M. L. Adams.

Inventor:
Frank H. Howes
Per Edw. E. Lumly
Atty.

(No Model.) 2 Sheets—Sheet 2.

F. H. HOWES.
LOCK NUT.

No. 361,289. Patented Apr. 19, 1887.

Witnesses.
R. C. Howes.
M. L. Adams

Inventor:
Frank H. Howes.
Per Edw. E. Quimby,
Atty.

UNITED STATES PATENT OFFICE.

FRANK H. HOWES, OF EAST ORANGE, NEW JERSEY.

LOCK-NUT.

SPECIFICATION forming part of Letters Patent No. 361,289, dated April 19, 1887.

Application filed November 17, 1886. Serial No. 219,161. (No model.)

*To all whom it may concern:*

Be it known that I, FRANK H. HOWES, of East Orange, New Jersey, have invented certain Improvements in Lock-Nuts, of which the following is a specification.

This invention, which relates to a mode of locking a nut upon its bolt, consists, broadly, in combining a bolt provided with a ratchet-thread whose pitch is uniform throughout with a nut provided with a ratchet-thread whose pitch is also uniform throughout, but is different from the pitch of the bolt-thread—as, for example, combining a three-quarter-inch bolt having a ratchet-thread whose pitch is ten to the inch with a nut having a ratchet-thread whose pitch is nine and six-tenths to the inch.

The invention also embraces the employment, in a bolt and nut provided with ratchet-threads which are respectively of uniform but relatively of different pitches, of a ratchet-thread in the nut the angle of the narrow side of which is different from the angle of the narrow side of the bolt-thread.

The object of this invention is to produce, solely by the interaction of the bolt and nut, a gradually-increasing interference of their threads with each other, so that while the nut can be easily started on the bolt and can be freely turned one, two, or more revolutions, as may be arranged, the ultimate effect of the continued turning of the nut upon the bolt will be the bending backward of some of the threads by the impact of their narrower sides upon each other, whereby the angles of their narrower sides with their longer sides will become less acute, and not only will the nut thus be jammed upon the bolt, but it will be incapable of removal, except by the continued application during such removal of force sufficient to overcome the increased friction resulting from the variably-distorted conditions of those of the threads which have been engaged with each other.

The jamming of a nut upon a bolt has heretofore been effected by making the bolt-thread or the nut-thread of gradually-changing pitch, and it has also been effected by making the threads of the nut and bolt, respectively, of different shapes in cross-section, but of like pitch.

In the present invention the threads of the nut and bolt are each made of uniform pitch throughout, but the pitch of one is made to differ in a prescribed degree from the pitch of the other, and such difference is calculated with reference to the number of revolutions which the nut is required to turn before being brought home against the object through which the bolt is inserted, so that by the time the nut has been brought to its ultimate position there will have been such an extent of interference of the threads of the nut with those of the bolt as will have produced the desired upsetting of the threads, whereby the jamming of the nut upon the bolt is effected without dependence upon the impact of the nut against the face of the object through which the bolt is inserted.

Figure 2:
Figure 3:
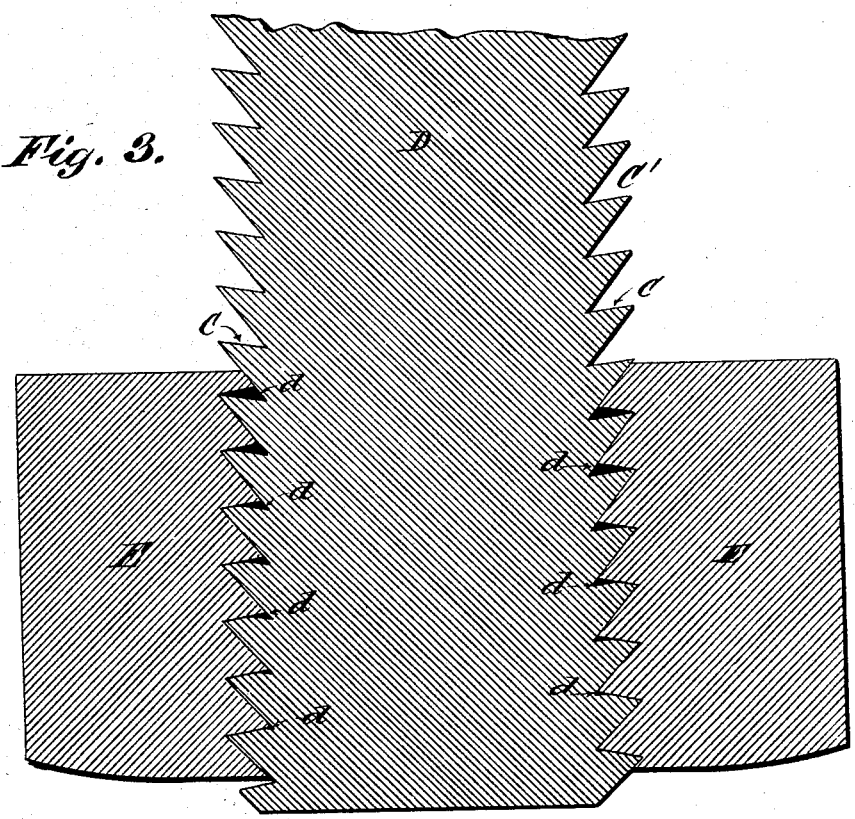

The accompanying drawings of bolts and nuts, illustrating the invention, are as follows, viz:

Figure 1 is a longitudinal section of a bolt and nut the ratchet-threads of which are alike in form. Fig. 2 is a section of the nut, showing the original shape of the nut-thread. Fig. 3 is a longitudinal section of a bolt and nut provided with so-called grip-threads—*i. e.*, ratchet-nut threads and bolt-threads, which differ from each other in form in respect of the angles of their narrower sides to the axis of the bolt.

For convenience of illustration, the drawings are made to represent threads of excessively coarse pitch; but in practice a three-quarter-inch bolt will be provided, for example, with a thread of ten to the inch, and its nut with a thread of nine and six-tenths to the inch.

Fig. 1 represents a bolt, A, the shank of which is provided with a ratchet-thread, *a.* As originally formed, the narrow side of the thread is perpendicular to the axis of the bolt, the entire thread originally having the shape in cross-section of the four convolutions 1, 2, 3, and 4, which in Fig. 1 are represented as above the part of the bolt over which the nut B has been forced. Similarly, all the convolutions of the original nut-thread *b* are formed with their narrower sides, *b' b'*, &c., perpendicular to the axis of the nut.

The character of the effect produced by the interaction of bolt and nut threads of conflicting pitches is illustrated in Fig. 1, in which, as will be seen, the apices of those of the convolutions of the bolt-thread over which the nut has passed are, in variable degrees, tipped downward, and the apices of those of the convolutions of the nut-thread which have passed over the bolt are, in variable degrees, tipped upward. There is thus effected a gradual change in the angles of the narrow sides of the convolutions of the thread with the axis of the bolt. The narrow side of the convolution 5 of the bolt-thread and the narrow side of the convolution 5<sup>b</sup> of the nut-thread are slightly inclined outwardly and downwardly, as shown in Fig. 1; the convolution 6 of the bolt-thread and the convolution 6<sup>b</sup> of the nut-thread are a little more inclined; the convolution 7 of the bolt-thread and the convolution 7<sup>b</sup> of the nut-thread are farther inclined, the remaining convolutions, 8, 9, 10, 11, and 12, of the bolt-thread being still more inclined, and the remaining convolutions, 8<sup>b</sup>, 9<sup>b</sup>, and 10<sup>b</sup>, of the nut-thread being also still more inclined.

The extent of the changes in the angles of the narrow sides of the convolutions of the thread is purposely magnified in Fig. 1 in order to more clearly illustrate the character of the effect produced by the interference of a ratchet-thread of coarse pitch in the nut with a ratchet-thread of finer pitch on the bolt. This effect is produced progressively both upon the bolt-thread and upon the nut-thread; hence the upper convolutions of the nut-thread are less distorted from their original angles than the lower convolutions are; and it therefore follows that when the nut has been screwed on to the bolt to the position which it is intended to occupy, as illustrated in Fig. 1, the upper convolutions of the nut-thread do not have the same angles upon their sides as the lower convolutions, and hence the upper convolutions of the nut-thread will not fit those convolutions of the bolt-thread which are at the time engaged by the lower convolutions of the nut-thread. Therefore the nut, having been screwed on to the desired position, cannot be unscrewed without the application to it of sufficient force to again upset the threads both of the nut and bolt.

It will be obvious that the base or root of a ratchet-thread is much stronger than its apex in respect of its capacity to resist strains in directions parallel with the axis of the bolt. It will therefore be understood that the effectiveness of the interaction of the bolt and nut in producing the gradual distortion and jamming of the threads shown and described is greatly promoted by the ratchet forms of those threads, from which it results that the apices, which are the weakest parts of the threads, bear upon the roots or bases, which are the strongest parts of the threads.

Fig. 3 illustrates the employment of the broad feature of the invention in connection with so-called "grip-bolts," the peculiarity of which is that the angle of the shorter sides of the nut-threads with relation to the axis of the bolt is different from the angle of the shorter sides of the bolt-threads with relation to the axis of the bolt. Thus either the bolt or the nut may be originally provided with an undercut thread—for example, like the undercut thread C (shown in Fig. 3)—in that part of the shank C' of the bolt D over which the nut E has not passed, in which case the nut may be provided with a ratchet-thread whose shorter sides are either perpendicular to the axis of the bolt or are inclined thereto in a less degree than, or in the opposite direction from, the shorter sides of the bolt-threads.

It results from the difference in the respective angles of the shorter sides of the two threads that when the nut E is first applied to the bolt D the only parts of the shorter sides of the two threads which bear upon each other are the base of the nut-thread and the apex of the bolt-thread, and that there is left between the shorter sides of the two threads a vacant space, $d \, d \, d$, &c., which is triangular in cross-section. It follows that the progression of the nut upon the bolt does not at first distort the nut-thread, but does distort the bolt-thread, the apices of the engaged convolutions of the bolt-thread only being bent backward; hence only a comparatively moderate force will be required to turn the nut E upon the bolt D in the act of applying the nut to the bolt until the nut has been turned so many revolutions and the apices of the bolt-thread bent backward so far that the apices of the convolutions of the nut-thread are brought into contact with the narrow sides of the convolutions of the bolt-thread. The number of revolutions of the nut required to bring about such contact will of course vary with the width of the spaces between the narrow sides of the bolt and nut threads. If there is only a slight difference between the angles of the narrow sides of the bolt and nut threads those spaces will of course be narrow, and a less number of revolutions of the nut will close them up. If the difference between the angles of the narrow sides of the bolt and nut threads is greater, then the spaces will be wider, and the nut can in that case be turned a greater number of revolutions before the apices of the convolutions of the nut-thread will be brought into collision with the narrower sides of the convolutions of the bolt-thread. In view of these considerations, the difference between the angles of the narrow sides of the bolt and nut threads can be proportioned with reference to the number of revolutions which it is desired the nut shall be capable of making before completely closing up the spaces between the narrow sides of the bolt and nut threads; and it will be seen that provision may be made for screwing on the nut to the position which it is intended to ultimately occupy, either with or without fully closing the spaces between the narrow sides of the convolutions of the bolt and nut threads.

It will be understood that the term "ratchet-thread" herein used is intended to comprehend any form of screw-thread whose shape in cross-section is such that one side is longer than the other side.

What is claimed as the invention is—

1. The combination, as herein set forth, of a screw-bolt provided with a ratchet-thread of prescribed uniform pitch with a nut provided with a ratchet-thread of a different uniform pitch.

2. A screw-bolt provided with a ratchet-thread of prescribed uniform pitch, the narrow side of which thread is formed at a prescribed angle with the axis of the bolt, in combination with a nut provided with a ratchet-thread of a different uniform pitch, the narrow side of which nut-thread is formed at an angle with the axis of the nut, which is different from the angle of the narrow side of the bolt-thread to the axis of the bolt.

FRANK H. HOWES.

Witnesses:
M. L. ADAMS,
R. C. HOWES.